Figure 1:
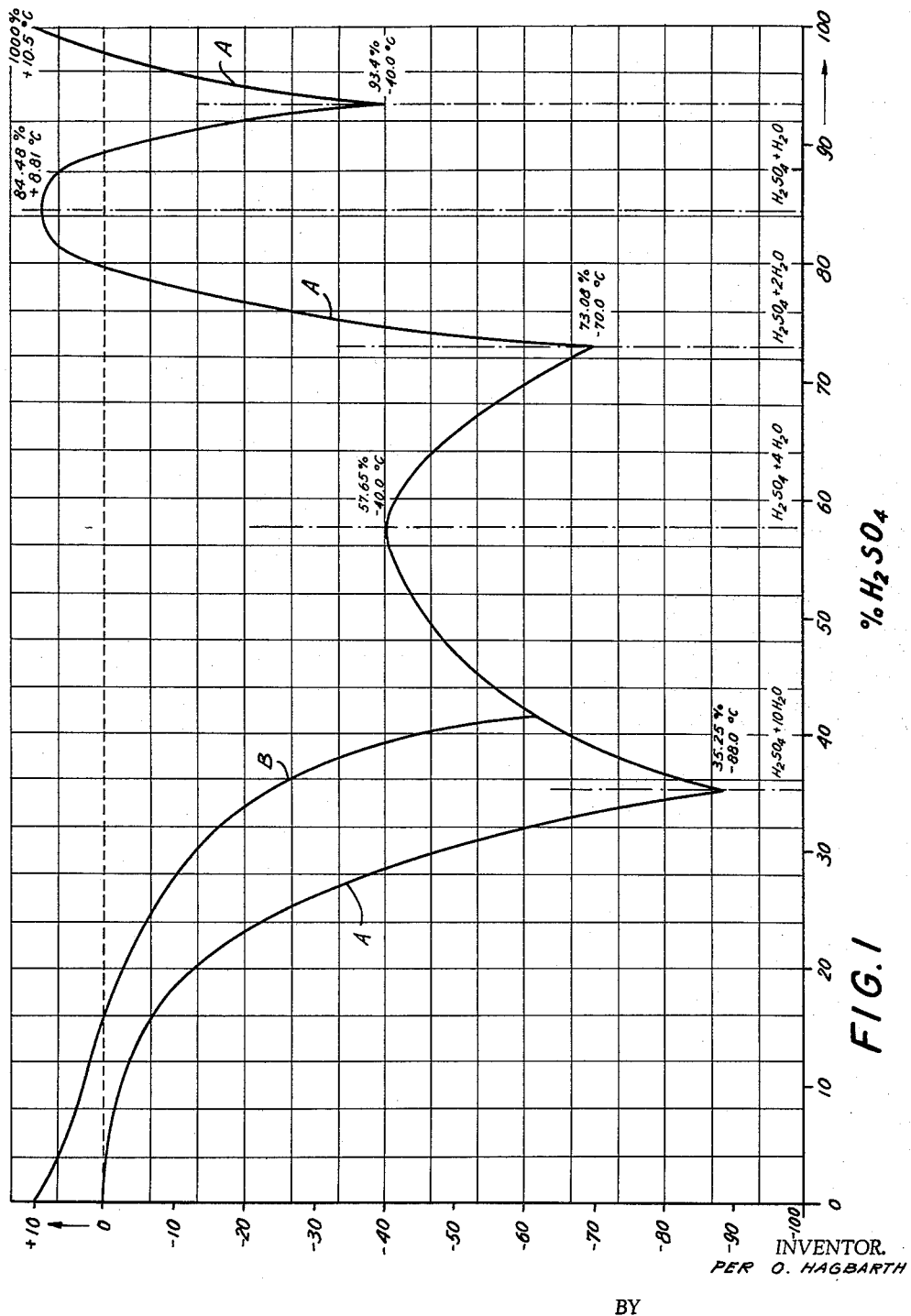

United States Patent Office 3,215,504
Patented Nov. 2, 1965

3,215,504
PLATE TOWER
Per O. Hagbarth, Blittersdorffplatz 43,
Frankfurt am Main, Germany
Filed Jan. 4, 1962, Ser. No. 164,319
Claims priority, application Germany, June 26, 1961,
H 42,960
10 Claims. (Cl. 23—283)

This invention relates to plate towers, and particularly to a tower suitable for drying moisture bearing chlorine gas.

Chlorine gas released from aqueous liquids, such as the electrolyte in conventional cells in which chlorine is liberated by the electrolysis of hot brine, is substantially saturated with water vapor at the temperatuure of the liquid. It is common practice to reduce the temperature of electrolytically produced chlorine gas to a temperature near room temperature, whereby a portion of the moisture contained in the gas is condensed, and then to contact the clorine gas saturated with moisture at the reduced temperature with strong sulfuric acid which absorbs moisture. The dried gas is then usually further cooled and compressed to liquefy it for storage or shipment.

The amount of residual moisture in the dried gas is of critical importance for the success of the liquefaction operation. If the chlorine gas is to be liquefied by means of modern dry compressors without unduly shortening the useful life of the compressors, the moisture in the gas must be reduced to a lower value. Dew points of the order of −50° C. were obtainable heretofore only by prolonged contact with almost anhydrous sulfuric acid.

The usual equipment for drying electrolytic chlorine gas consists of a battery of packed columns or towers in which the chlorine passes upward countercurrent to descending sulfuric acid. In order to maintain a layer of moisture absorbent liquid on the tower packing, it is necessary to recycle the acid in each tower at a relatively high rate. The gas is sequentially passed through all towers of the battery, and the concentration of the sulfuric acid recirculated in the individual towers increases in the sequence of gas passage. Three towers operating at three levels of sulfuric acid concentration are normally employed. The concentration of the recirculated acid changes only very slowly during operation of each tower. It is customary, therefore, to withdraw about one twentieth of the acid reaching the tower bottom and to feed the withdrawn acid to the tower operating at the next lower concentration of sulfuric acid, while nineteen twentieths of the acid are returned to the tower top.

Conventional drying tower batteries consist of one tower in which the chlorine gas is cooled by direct counter current contact with a stream of cold water, and of three countercurrent absorption towers operated at respective sulfuric acid concentrations of 94, 70 and 50 percent. The acid discharged from the last tower is too dilute to warrant transportation to a remote place of consumption, and is yet too concentrated to be conveniently discarded.

It is well known that chlorine gas forms a solid hydrate with chlorine saturated water at temperatures lower than 9.8° C. It is therefore common practice to operate the water cooling tower at temperatures not lower than 10° C. The heat of hydration of sulfuric acid keeps the operating temperature of the other three towers above 10° C. under all atmospheric conditions. If solid chlorine hydrate were permitted to form, it would clog the towers and conduits leading liquid from the bottoms of the towers, and would rapidly interfere with operation of the plants.

I have now found that chlorine hydrate does not form in sulfuric acid at temperatures very much below 9.8° C. if the concentration of the sulfuric acid is held within certain limits. Since it is not practical to absorb the moisture content of chlorine in solid sulfuric acid or its solid hydrates, the range of sulfuric acid temperatures and concentrations available for performing the method of my invention is limited to temperatures which are represented on a conventional chart of sulfuric acid concentration versus temperature by points above the line of equilibrium between liquid aqueous sulfuric acid and the solid hydrates of sulfuric acid.

This chart is shown in FIG. 1. The known equilibrium line A extends on this chart from a point at temperature 0° C. and 0 percent sulfuric acid in a continuous arc to a minimum point at −88.0° C. and 35.25 percent sulfuric acid by weight at which the solid phase is the dekahydrate of sulfuric acid. A second portion of the equilibrium line A extends thence in an upwardly arched curve through a maximum at 37.65 percent sulfuric acid and −40.0° C., corresponding to the tetrahydrate, to another minimum at 73.08 percent sulfuric acid and −70° C., corresponding to the dihydrate. The next portion of the equilibrium line passes in an upwardly convex arc through a maximum point at 84.84 percent sulfuric acid and 8.81° C., for the monohydrate of sulfuric acid, to a minimum point at 93.4 percent and −40° C., and thence extends to the melting point of pure sulfuric acid at 10.5° C.

I have found that a solid chlorine hydrate does not form when chlorine is contacted with liquid sulfuric acid the temperature and concentration of which is represented on the chart of FIG. 1, by an area above the line A and spaced toward higher sulfuric acid concentrations from a line B which extends in a continuous arc from a point at 9.8° C. at 0 percent sulfuric acid through a point at 0° C. and approximately 15.5 percent sulfuric acid to a point on the equilibrium line A which is close to the value for a sulfuric acid concentration of 42 percent. At this concentration, the equilibrium temperature between solid and liquid sulfuric acid hydrates is substantially −61° C., and chlorine gas may be dried by absorption of water in approximately 42 percent sulfuric acid at approximately −61° C. without precipitation of a chlorine hydrate nor of other solids.

I have found that the equilibrium curve between liquid and solid sulfuric acid hydrates is not significantly shifted by the presence of chlorine gas dissolved in the liquid phase. Technical calculations may therefore be based on the accepted values of temperature and concentration of the sulfuric acid hydrate equilibrium line.

The finding that moisture may be removed from chlorine by contact with sulfuric acid at temperatures very much below the conventional limit of 9.8° C. has permitted me to remove moisture from electrolytic chlorine gas in a very efficient manner at low operating cost, in equipment which occupies but a fraction of the space necessary for a conventional battery of absorption columns or towers, and is operated without the motive power necessary for the circulating pumps of conventional equipment. I have also found that absorption of moisture from chlorine gas at very lower temperatures permits the equipment to be constructed from materials of construction which offer important advantages over materials necessarily employed in towers operating at approximately ambient temperature.

The term "chlorine" as employed in this specification and the appended claims is not strictly limited to a gas consisting uniquely of the element chlorine, but the gas may include those minor impurities which normally accompany crude electrolytic chlorine gas, for example minor amounts of oxygen, and certain halogenated organic compounds which are formed from carbon anodes or from rubber cell linings in the electrolytic manufacture of chlorine.

Typical halogenated organic compounds found in crude electrolytic chlorine gas include hexachloroethane, symmetrical tetra chloroacetone, penta- and hexachloroacetone, hexachlorobenzene, 2,3,5,6-tetrachloroquinone, 1,2,4,5-tetrachlorobenzene, chloroform, and carbon tetrachloride. These chlorinated impurities form resinous and gummy substances which foul and dry compressors preferably employed in the liquefaction of chlorine gas. I have found that the amount of chlorinated impurities present in chlorine gas dried at the low temperatures of my invention by contact with sulfuric acid is substantially lower than the amount of impurities present in chlorine gas dried by conventional methods, and that dry compressors are not fouled by chlorine dried by my method, or are fouled only after periods of operation very much longer than those possible with conventionally dried chlorine gas under otherwise identical conditions.

The moisture content of the dried chlorine is a function of the equilibrium partial pressure of water vapor in the chlorine phase in contact with the sulfuric acid phase. This partial pressure is sharply lower with lower sulfuric acid temperatures. By operating at temperatures which are very much lower than those presently conventional, I am capable of producing chlorine gas on an industrial scale which has a lower dew point than conventionally dried chlorine gas without increase in the consumption of sulfuric acid. Conversely, I can produce chlorine gas the moisture content of which satisfies the usual requirements at a substantial saving in sulfuric acid by taking advantage of the low equilibrium water vapor pressure of relatively dilute sulfuric acid solutions at low temperatures.

Figure 2:
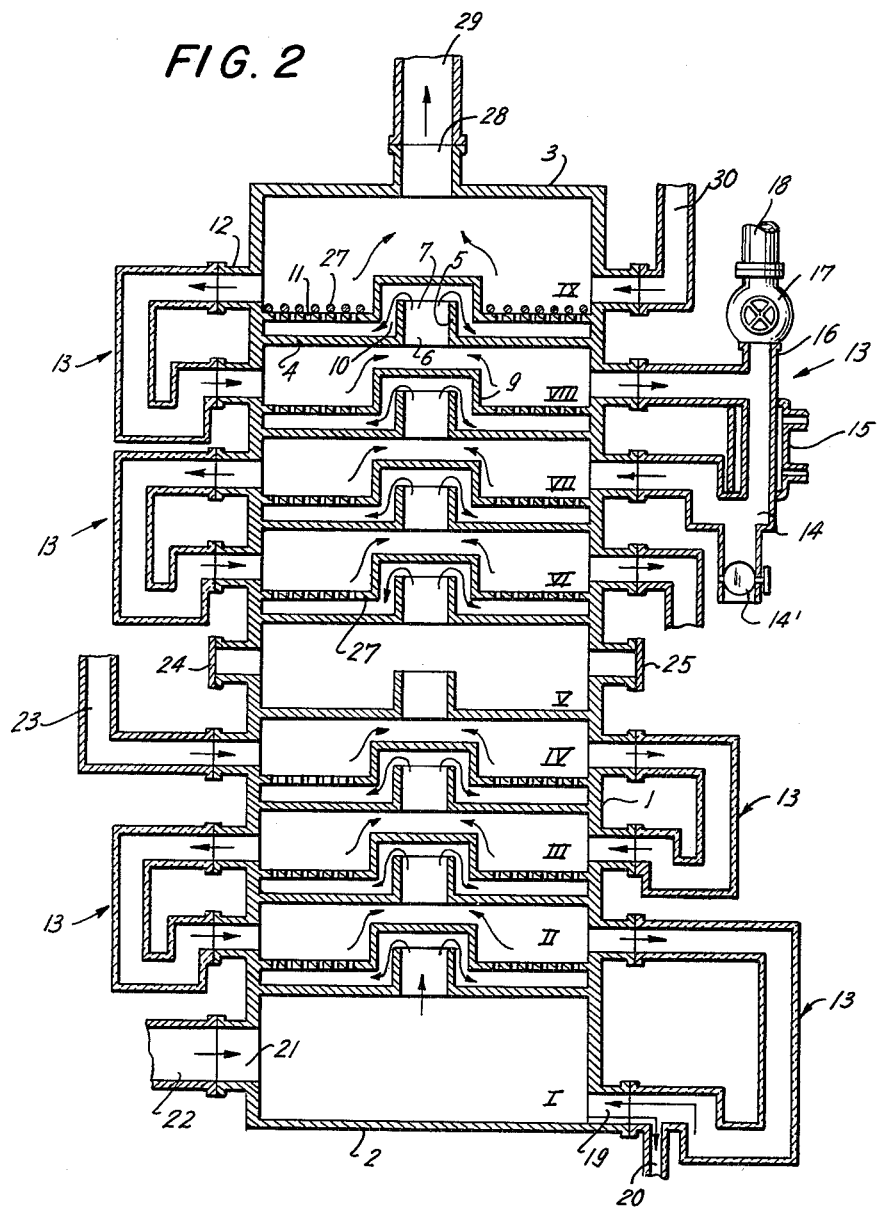
Figure 3:
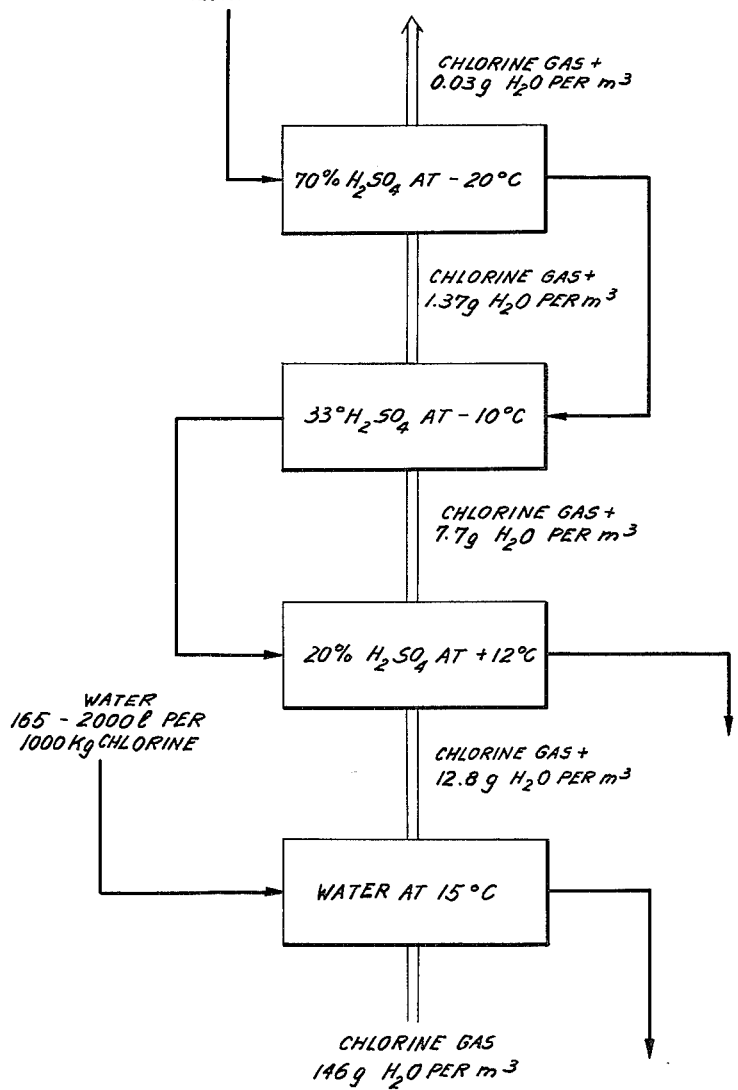

Other features and many of the attendant advantages of this invention will be readily appreciated as the same becomes better understood by reference to the following detailed description when considered in connection with the accompanying drawings, wherein:

FIG. 2 shows a novel absorption tower employed for carrying out the afore-described method, the tower being shown in elevational section; and FIG. 3 is a flow sheet indicating typical operational parameters for the apparatus of FIG. 2 when employed for the absorption of moisture from electrolytic chlorine by means of sulfuric acid.

FIG. 2 shows a tower of the invention the external walls of which are formed by a cylindrical shell 1, and which is axially closed by a transverse bottom 2 and a cover 3. The cavity within the shell 1 is subdivided into nine compartments I to IX in ascending order by solid horizontal walls 4. Short cylindrical tubes 5 are supported on each horizontal wall 4 coaxially with the shell 1. Each tube 5 passes through the supporting wall 4 and thus has a lower orifice 6 in one compartment and an upper orifice 7 in the superposed next compartment.

Seven of the nine compartments of the tower are divided into an upper and a lower portion by a foraminous plate 8 which is horizontally arranged below the level of the upper orifice 7 of the tube 5 in the corresponding compartment. The plate 8 is of annular shape. It has an axial opening which is sealed by a bell shaped cap 9. The cap spacedly surrounds the upper terminal portion of the tube 5 and its orifice 7. The cap 9 is of solid material and impervious to gas or liquid. It communicates with the lower portion of the corresponding compartment by an annular orifice 10.

The effective flow section of orifice 10 is approximately the same as that of the tube 5, and approximately equal to the combined flow sections of the perforations 11 in the plate 8.

The shell 1 has openings provided with flanged pipe nipples 12, two openings with corresponding nipples being provided in each compartment and arranged in the upper portion of the compartments having a plate 8. The nipples 12 are aligned in two vertical rows diametrically opposite each other. In each compartment, one of the openings in the shell 1 with the corresponding nipple constitutes a feed conduit, whereas the other opening and nipple 12 constitute a discharge conduit which also serves as an overflow weir and determines the maximum height a liquid may reach in the upper compartment portion.

The discharge conduits of compartments II, III, IV, VII, VIII and IX are connected with the respective feed conduits of the subjacent compartments I, II, III, VI, VIII and VII, by conduits 13 connecting the upper portions of two superimposed compartments. Each connecting conduit has an inverted siphon portion 14 which, when filled with liquid, forms a gas tight seal in the connecting conduit. A spigot 14' is provided in each siphon portion 14. The conduit 13 connecting the compartments VII and VIII is provided with a jacket 15 through which a refrigerant may be circulated to cool a liquid passing through the conduit. The same connecting conduit is also provided with a side tube 16 connected to a supply line 18 by a valve 17 so that a liquid material may be admitted to compartment VII of the tower, or a gas may be admitted to compartment VIII at a rate controlled by the valve 17.

The lowermost compartment I includes the saucer of the tower. It does not have a foraminous plate. It has two openings in its shell portion. One opening 19 is connected to the superimposed compartment II by a connecting conduit 13, and is located near the bottom of the compartment I. It also communicates with a discharge pipe 20 leading downward from the tower.

The other opening 21 on the shell of the compartment I is of substantially greater diameter than the opening 19 and located well above the level of the latter opening. A large gas pipe 22 is flanged to the opening 21.

Compartments II, III, and IV are connected to each other by connecting conduits 13 arranged alternatingly between nipples in opposite rows. The feed conduit of the compartment IV is connected to a water line 23. Compartments II, III, IV are each equipped with a foraminous plate 8 carrying a bell shaped cap 9.

Compartment V has no plate 8, and its shell openings 24 and 25 are capped. Compartments VI, VII, VIII and IX are each divided into two portions by a plate 8 with cap 9, and are connected to each other by connecting conduits 13 in the manner described above. Compartment VI is equipped with a discharge pipe 26 communicating with its discharge conduit.

Compartment IX in addition to its shell openings has a wide central opening 28 in the cover 3 which closes the top of compartment IX. A tube 29 communicating with the opening 28 leads away from the tower. The shell opening of the compartment IX which constitutes a feed conduit is connected to an acid supply line 30. A cooling coil 27 is placed on the plate 8 in compartment IX in such a manner as not to obstruct the perforations 11 in the plate. The coil is connected to a source of refrigerant fluid in a conventional manner, not further illustrated.

The aforedescribed apparatus is operated as follows:

Crude hot moisture bearing chlorine gas is fed from an electrolytic cell to the tower through the gas pipe 22 at compartment I while cold water enters compartment IV through the water line 23. Water initially flows downward through the perforations 11 in the plate 8 of compartment IV until the lower portion of the compartment is filled and the water begins to overflow through the connecting conduit 13 to compartment III. The upper orifice 7 of the tube 5 is at a higher level than the overflow at the discharge conduit of compartment IV so that the interior of tube 5 remains dry.

The water overflowing from compartment IV into compartment III fills the lower portion of the compartment, and as much of the upper portion as the overflow arrangement permits if an opposed gas flow does not interfere, and compartment II is partially filled with water in a similar manner. Since the discharge pipe 20 is located close to the bottom 2 in compartment I, no substantial body of liquid accumulates in the saucer at any time.

While water descends from compartment IV toward compartment I for eventual discharge through the pipe 20, chlorine rises from compartment I through the tube 5 in the wall 4 forming the top of compartment I. The gas overflows through the orifice 7 into the cap 9 and drives out any water present in the annular orifice 10. The chlorine is fed to the tower under a pressure sufficient to permit water to be displaced almost completely from the lower portion of the compartment II, and chlorine gas rises in a multiplicity of bubbles or narrow streams through the perforations 11 of the plate 8. The gas passes through a layer of water on top of the plate 8, then passes through a tube 5 into the superposed compartment III where the same sequence of events takes place.

Shortly after start of the operation, a state of equilibrium is reached in which water is almost completely removed from the lower portions of the compartments II, III and IV and flows in the compartments in a substantially horizontal stream over the upper face of each plate 8 from the feed to the discharge conduit of the compartment. The thickness of the water level is determined by the vertical distance between the upper face of the plate 8 and the overflow constituted by the discharge conduit. Chlorine passes vertically through the stream of water in small bubbles.

During its repeated passages through the water streams, the chlorine gas is cooled to a temperature about equal to the original water temperature. Since the gas entered the tower saturated with water at a much higher temperature, a portion of the moisture in the chlorine gas is condensed and mixes with the cooling water. The cooling water also is saturated with chlorine at the temperature at which the water leaves the tower through the discharge pipe 20. Since the final water temperature is approximately as high as the original temperature of the chlorine gas, the chlorine losses with the cooling water are small, and at least a portion of the chlorine may be recovered from the water and returned to the process in a known manner.

The cooled chlorine gas saturated with water at the initial temperature of the cooling water passes through the otherwise empty compartment V where the minute amount of water droplets, if any, entrained by the chlorine stream is deposited. The chlorine stream then sequentially passes through the compartments VI, VII, VIII and IX substantially in the same manner as described above in connection with compartments II, III and IV.

Concentrated sulfuric acid is fed to the upper portion of compartment IX at a rate sufficient to maintain in compartment IX a sulfuric acid concentration which at the prevailing temperature reduces the moisture content of the chlorine gas discharged through the opening 28 to that desired in the end product. The concentration of the acid in compartment IX may be raised by increasing the flow of concentrated sulfuric acid. The temperature of the acid may be controlled by the cooling coil 27.

For each volume of concentrated acid fed to compartment IX, a body of acid having a lower concentration and a volume related to that of the added concentrated acid by the inverse ratio of the concentrations, that is, a larger volume, is discharged toward the compartment VIII.

The acid flowing from the compartment IX into the connecting conduit leading to compartment VIII passes in a thin layer through the nipple 12 which connects the compartment IX with the conduit 13. A relatively low rate of liquid flow is inherent in my invention which does not require recirculation of acid, but in which the acid flows in a continuous path from the top toward the bottom of the tower, and thence out of the system. The acid leaving compartment IX through a nipple 12 thus flows relatively slowly through the nipple. The body of acid in the compartment proper is held in a state of turbulence by the chlorine gas passing upwardly through it. The liquid in the solid-walled nipple does not receive gas from below, and yields whatever residual gas may have been carried along. Inspection of the borosilicate glass siphons 14 in a tower of my invention reveals a homogeneous liquid free from bubbles of entrained gas.

The fact that chlorine is not returned by the flowing acid to a lower compartment contributes greatly to the efficiency of the apparatus. This efficiency is further enhanced by the fact that virtually no acid is carried upward by the stream of chlorine to dilute the more concentrated liquid on a higher level. Several factors cooperate to keep the gas virtually free of entrained liquid droplets. The most important one is the fact that the chlorine gas passes upwardly through a relatively heavy body of acid in each compartment. The ratio between free acid surface and acid volume is very much lower than in a packed tower or in a spray tower. The amount of liquid entrained in droplet form is closely related to this ratio. Another contributing factor is the arrangement of a single riser pipe 5 for the chlorine gas in each compartment having a lower orifice 6 superposed on the imperforate area defined thereunder by a cap 9. Any acid droplets released by the surface of the acid above the foraminous plate 8 must undergo at least one change of direction before entering the orifice 6. The abrupt change in the direction of gas at the upper orifice 7 of each tube further causes entrained liquid to fall back into the lower compartment.

The acid in compartment VIII is at a lower concentration than that in compartment IX and is reinforced by the overflow from that compartment, while at the same time a body of acid diluted by absorbed water is discharged to compartment VII. The temperature at that compartment may be influenced by the cooling jacket on conduit 13 connecting compartments VIII and VII. Additional acid, water, or both may also be added to compartment VII through the valve 17.

The need for such additions may readily be gaged from the appearance of the acid in the connecting conduits 13 at least some of which are preferably made of borosilicate glass, and from a test on the liquid overflowing through the conduits of which a sample is readily taken through the spigot 14′. If the acid temperature is too low, either greenish crystals of chlorine hydrate or white crystals of sulfuric acid are clearly observed in the connecting conduits 13 before they become too numerous to seriously interfere with the operation of the tower. Corrective measures are readily taken, and may include the addition of water, acid, or both to any one of the compartments, and the throttling of refrigerant circulation through the jacket 15 and the coil 27.

While for the sake of clarity only one connecting conduit 13 has been shown to be equipped with a cooling jacket 15 and a spigot 14′, and only compartment IX has been shown to be equipped with a cooling coil, all connecting conduits may be equipped with a jacket and a spigot, and cooling coils may be arranged in any compartment where this may appear to be desirable. A tower in which each compartment is equipped with cooling and sampling facilities will be preferred where operating conditions vary widely.

Very satisfactory drying results are obtained in towers of the invention which consist of only four superimposed compartments having a combined height of approximately eight feet, and a drying capacity equal to or better than that of a battery of four conventional towers of equal diameter, each about thirty feet high. While the known towers each require a heavy circulating pump, the tower of the invention is operated entirely by gravity flow.

Each of the four compartments of the tower, the operation of which will now be illustrated in a numerical example with reference to the flow sheet of FIG. 3, is identical with one of the compartments II–IV or VI–IX illustrated in FIG. 2. The tower may thus be assembled from standardized compartment units with a saucer unit and a cover unit in a manner well known in itself. The several units may be connected by bell-and-spigot joints or in any other manner suitable for the material of construction employed.

Chlorine gas saturated with 146 grams of water per cubic meter is introduced from an electrolytic cell into the saucer unit, and rises therefrom to the lowermost compartment in which it is washed with water at 15° C. A single passage of the gas through a water layer on the plate 8 replenished at a rate of 165–2000 liters per metric ton of chlorine is sufficient to reduce the water content of the gas to 12.8 grams per cubic meter. The pre-dried and cooled chlorine gas then enters the first drying compartment through a conduit formed by the tube 5 and the annular orifice 10 of the last-mentioned compartment.

It is contacted in the first drying compartment with aqueous sulfuric acid the concentration of which is held at twenty percent by weight by means of stronger acid overflowing from the second drying compartment. The temperature of the acid in the first drying compartment is 12° C., and is maintained by a cooling coil 27. The acid is discharged to waste or to other uses by overflow through the discharge conduit of the first drying compartment at a rate determined by the acid additions from the second drying compartment and the amount of water absorbed from the chlorine gas.

The second drying compartment receives sulfuric acid at 70 percent and —20° C. from the third compartment at a rate sufficient to maintain an acid concentration of 33 percent in the second compartment. The temperature of the latter comparmtent is held at —10° C. by a cooling coil. The chlorine passed from the second to the third compartment holds only 1.37 grams of water per cubic meter.

The third and highest drying compartment is fed sulfuric acid of 96 percent concentration precooled to —20° C. at a rate of 1.1 kilograms of acid for each metric ton of chlorine discharged from the tower cover. The temperature of the third compartment is held at —20° C. and the overflow is suitably set to maintain an acid concentration of 70 percent. The chlorine gas discharged from the opening in the tower cover holds less than 0.03 gram of water per cubic meter and has a dew point lower than —50° C. It is liquefied in conventional equipment (not shown) and causes substantially less maintenance work at the dry compressors used in the liquefaction operation than conventionally dried chlorine, even if it were practical to dry chlorine gas on a large industrial scale in the usual equipment to as low a water content as is conveniently and routinely possible with the method and the drying tower of my invention.

The second and third drying compartments of the tower operate under condition of temperature heretofore considered impractical in this art. Yet, no chlorine hydrate nor other solids are precipitated from the acid which is refrigerated to temperatures very much lower than the 9.8° C. which were considered the lower limit of absorption tower temperature.

At these low temperatures, many materials of construction readily resist the combined corrosive effects of chlorine and strong sulfuric acid, and the tower need not be built entirely of ceramic material, which until now was the preferred building material, such elements as the foraminous plates 8 are produced from metal or plastics not only at a fraction of the cost of equivalent ceramic elements, but the number and size of perforations which may be formed in a non-plasticized polyvinyl chloride plate or a titanium plate, without unduly weakening the plate, are many times greater than the corresponding dimensions of a ceramic plate. The more advantageous use of materials of construction at the low processing temperatures of my method contributes greatly to the high efficiency of the tower of this invention which is several times higher than that of conventional equipment of equal size drying chlorine with sulfuric acid by the best known methods.

The tower compartments of the invention may be superposed in any desired manner to provide towers of desired performance properties. The tower represented in the flow sheet of FIG. 3 can be equipped with an additional compartment operated at —50° C. with 73 percent sulfuric acid to produce chlorine gas bearing even less water than is contained in the product of the illustrative example of FIG. 3. Other modifications of the method to produce different results are readily derived from the above teachings.

The tower or column of the invention is also employed to advantage in other processes. The gas pressure drop within the column is relatively small because of the large effective flow section of all gas conduits. The visual observation and convenient sampling of the liquid descending countercurrent to the gas from compartment to compartment in the tower of my invention permit control of many processes in a manner not available without complex instrumentation in known absorption columns. This is of particular advantage where the tower is employed as a reactor for gas-liquid reactions.

The towers of the invention are greatly superior to packed towers where the liquid phase undergoes relatively minor changes in its reaction with the gas phase, as in the drying of chlorine with aqueous sulfuric acid. The flow rate of the liquid phase may be reduced to the minimum consistent with the changes in the liquid, and may readily be stopped altogether if so desired, by shut-off valves arranged in the external connecting conduits 13 in a manner too well known to require illustration.

A tower equipped with valves 17 which give controlled access to the several compartments may be operated without loss of efficiency at production rates which are only a minor fraction of the design capacity of the tower. A skilled operator will be able to achieve all but the very lowest production rates without resorting to external controls, by merely varying the amount of liquid fed to the highest compartment and by suitably changing the temperature of the liquid in the several compartments.

The tower of the invention may be operated entirely without pumps or other continuously moving machine elements. Leakage of process liquid is readily avoided. Maintenance cost is substantially reduced.

As long as at least one compartment of the tower is operated at a temperature not higher than —20° C., the amount of organic impurities in the dried chlorine gas is virtually nil, and the efficiency of conventional pumping installations employed in liquefying the chlorine gas is greatly improved.

Chemical processes for which superposed compartment units of the tower of the invention are eminently suitable include the production of chlorine dioxide from an aqueous solution of sodium chlorate, sulfuric acid, and sulfur dioxide gas in a reaction well known in itself. The entire chlorine content of the sodium chlorate is readily recovered as chlorine dioxide when sodium chlorate solution and sulfuric acid are fed to the top of a tower having as few as four compartments, and sulfur dioxide gas is introduced from the bottom. The efficiency of this reaction can be greatly increased by close control of the liquid composition in each compartment which is readily achieved by means of the external connecting conduits.

Obviously, many other modifications and variations of the present invention are possible in the light of the above teachings. It is therefore to be understood that within the scope of the appended claims, the invention may be practiced otherwise than as specifically disclosed.

I claim:
1. In a tower of the type described, in combination:
 (a) a shell defining a vertically extending cavity;
 (b) a plurality of fluid-impervious, vertically spaced, horizontally extending walls in said cavity;
  (1) said walls defining therebetween a plurality of superposed compartments in said cavity;
 (c) a plate horizontally extending in each compartment,

(1) said plate having a foramious portion vertically spaced from the walls defining said compartment,
(2) said plate dividing said compartment into an upper portion and a lower portion,
(3) said compartments including a first and a second compartment, said second compartment being superposed on said first compartment;
(d) first overflow means connecting the lower portion of said second compartment with the upper portion of said first compartment and defining a first overflow level in said lower portion,
(1) said first overflow means including a first conduit having two orifices respectively directly communicating with said lower portion of said second compartment and said upper portion of said first compartment; and
(e) second overflow means connecting the upper portion of said second compartment with the upper portion of said first compartment and defining a second overflow level in said upper portion of said second compartment,
(1) said second overflow level being higher than said foraminous portion and lower than said first overflow level, and
(2) said second overflow means including a second conduit having two orifices respectively directly communicating with said upper portion of said second compartment and said upper portion of said first compartment.

2. In a tower as set forth in claim 1, said second conduit having a portion intermediate said orifices thereof, said conduit portion being outside said cavity.

3. In a tower as set forth in claim 2, means for admitting a fluid to said portion of said second conduit.

4. In a tower as set forth in claim 1, liquid feed means for feeding a liquid to the upper portion of said second compartment; and gas feed means for feeding a gas to the lower portion of said first compartment.

5. In a tower as set forth in claim 4, gas discharge means for withdrawing gas from the upper portion of said second compartment; and liquid discharge means for withdrawing liquid from the upper portion of said first compartment.

6. In a tower as set forth in claim 5, refrigerating means for maintaining a liquid in said second compartment at a predetermined temperature between substantially 9.8° C. and −88.0° C.

7. In a tower as set forth in claim 1, another portion of said plate extending upward from said foraminous portion and constituting a downwardly open bell spacedly enclosing an orifice of said first conduit.

8. In a tower as set forth in claim 7, said foraminous portion being formed with a multiplicity of perforations connecting the portions of said compartment, the flow section of each of said perforations being substantially smaller than the flow section of said first conduit.

9. In a tower as set forth in claim 8, the combined flow sections of said perforations being substantially equal to the flow section of said first conduit.

10. In a tower as set forth in claim 7, said bell being fluid-impervious.

References Cited by the Examiner

UNITED STATES PATENTS

| | | | |
|---|---|---|---|
| Re. 23,690 | 7/53 | Dunning | 23—219 |
| 699,572 | 5/02 | Rocca | 261—114 X |
| 905,602 | 12/08 | Sperry | 23—219 |
| 1,782,862 | 11/30 | Wagner | 261—114 |
| 1,862,746 | 6/32 | Gillett | 23—283 |
| 2,762,692 | 9/56 | Spitz et al. | 23—283 |

FOREIGN PATENTS

| | | |
|---|---|---|
| 484,394 | 7/17 | France. |

MORRIS O. WOLK, *Primary Examiner.*

MAURICE A. BRINDISI, JAMES H. TAYMAN, JR.,
*Examiners.*